Nov. 29, 1960 L. H. HAWTHORNE 2,962,306
WELDING TUBES TO TUBE SHEETS
Filed Feb. 13, 1958

Inventor:
Lowell H. Hawthorne,
by Emery Booth Townsend
Miller + Weidner Att'ys

United States Patent Office 2,962,306
Patented Nov. 29, 1960

2,962,306

WELDING TUBES TO TUBE SHEETS

Lowell H. Hawthorne, Verona, N.Y., assignor to Revere Copper and Brass Incorporated, Rome, N.Y., a corporation of Maryland Filed Feb. 13, 1958, Ser. No. 715,125

3 Claims. (Cl. 285—222)

My invention relates to welding, and particularly concerns the welding of tubes to tube sheets and the like by fusion welding by use of an arc struck from a non-consumable electrode.

Applicant has found it is difficult to obtain a satisfactory weld by fusion arc welding certain alloy metals particularly in welding a tube to a tube sheet or the like by use of automatic welding apparatus in which the arc makes a single pass circumferentially about the joint to be welded, for example, by use of the automatic welding gun disclosed by applicant's now pending application Serial Number 619,308, filed October 30, 1956.

The above difficulty occurs particularly when the tube sheet or the like or the tubes, or both, are of brass. With brass, unless something is done to prevent it, the high temperature of the arc causes the zinc of the molten brass to boil or otherwise rapidly volatilize from it, with the result that the weld is rendered porous and weak.

Brass tubes and tube sheets as commonly constructed contain anywhere from about 57 to 85% copper, with the balance zinc. It is also common to add small amounts of other elements, such as tin, aluminum, arsenic and iron, to the brass of the tubes for improving their resistance to corrosion and otherwise improving their physical and chemical properties. Examples of brass tubes most commonly employed are as follows:

"Red brass," which consists of approximately 80 to 85% copper, with the balance zinc;

"Seventy-thirty brass," which nominally consists of 70% copper and 30% zinc;

"Yellow brass," which consists of approximately 64 to 66% copper, with the balance zinc;

"Muntz metal," which nominally consists of 60% copper and 40% zinc, but commonly consists of 58 to 61% copper, with the balance zinc;

"Aluminum brass," which nominally is a ternary alloy consisting of about 74 to 78% copper, 1 to 3% aluminum, with the balance zinc;

"Admiralty brass" or "Admiralty metal," which nominally is "seventy-thirty brass" with 1% tin substituted for an equal amount of the zinc, but may consist of 69 to 71% copper, with 0.5 to 1.5% tin substituted for an equal amount of the zinc; and "Naval brass," which nominally is "Muntz metal" with 1% tin substituted for an equal amount of the zinc, but may consist of about 59 to 61% copper, 0.6 to 1.2% tin, with the balance zinc, sometimes also with about 0.05 to 0.5% lead substituted for an equal amount of the zinc for improving its machinability.

Examples of brass tube sheets most commonly employed are Muntz metal, Naval brass and aluminum brass. A very desirable combination for steam surface condensers is a tube sheet of Naval brass and tubes of Admiralty brass.

According to the present invention there is placed between the tube and the tube sheet at the joint to be welded a thin layer of metal which will melt and alloy with the molten metal of the tube and tube sheet for promoting welding and improving the quality of the weld. When the tubes and the tube sheet are of brass this metal is preferably silicon bronze which is copper containing a small amount of silicon, the silicon acting to prevent boiling out or evaporation of the zinc from the brass so that the weld will not be porous and consequently weakened, the resulting metal at the weld containing the silicon also being stronger than the brass or brasses of the tube and tube sheet. The silicon bronze may also contain small amounts of other elements for rendering it more readily workable during its fabrication, or for further promoting the welding of the brass, or for improving the quality of the weld. Preferably when brass is to be welded the silicon bronze consists of about 1 to 1.3% silicon and 0.2 to 0.3% manganese, with the balance copper, the manganese acting to make the silicon bronze more readily workable during its fabrication and acting to augment the effect of the silicon in respect to strengthening the metal at the weld. However, the silicon bronze may contain silicon within the range of about 1 to 4% and manganese within the range of about 0.2 to 2%. Other compositions of silicon bronzes which may be employed are 0.4 to 5% silicon, 0.1 to 0.6% iron, balance copper, and 85 to 95% copper, 0.25 to 4% silicon, 0.25 to 1% tin, balance zinc.

The invention however will be best understood from the following description, of several embodiments of the invention selected for illustrative purposes, when read in the light of the accompanying drawings, while the scope of the invention will be more particularly pointed out in the appended claims.

Figure 1:
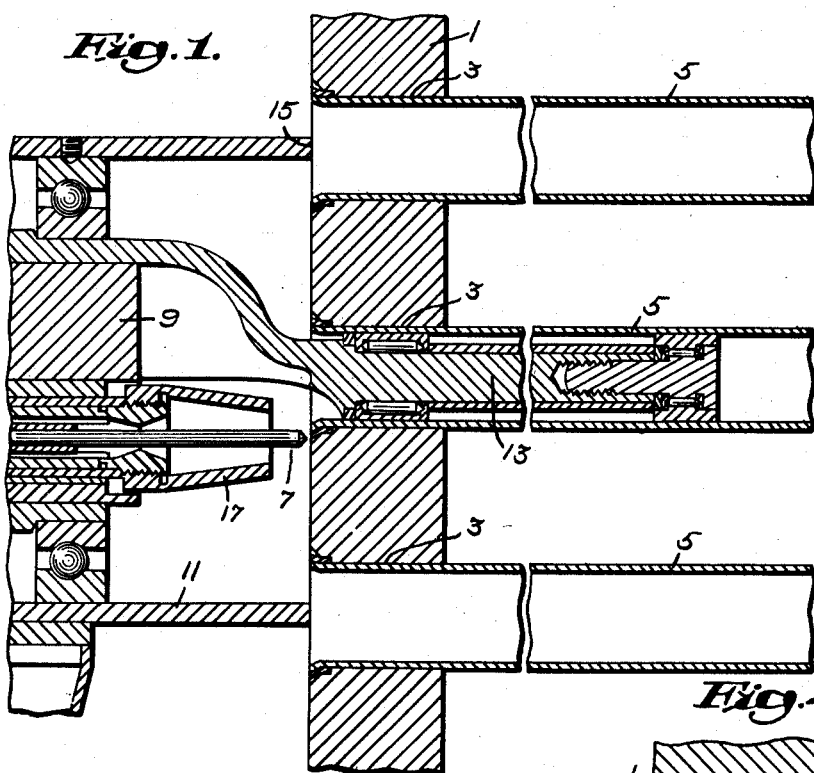
Fig. 1 is a fragmentary view showing several tubes in longitudinal section assembled with a tube sheet preparatory to being welded thereto by use of an automatic welding gun, a fragment of which latter is also shown in longitudinal section.
Figure 2:
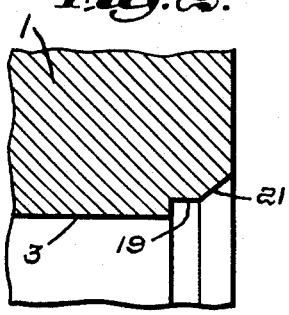
Fig. 2 is a longitudinal sectional view, on an enlarged scale, indicating the construction of the openings in the tube sheet for receiving the end portions of the tubes.
Figure 3:
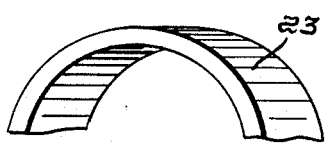
Fig. 3 is an isometric view, on an enlarged scale, of a fragment of a ring of the weld promoting metal preparatory to its being assembled with the tubes and tube sheet and operated upon to hold it in position.

Referring to Figs. 1 to 5 of the drawings, the illustrated assembly to be welded comprises a tube sheet 1 provided with through openings 3 which receive the end portions of the tubes 5, the body portions of the tubes lying at one side of the tube sheet and the ends of the tubes being positioned substantially in the plane of the opposite side of said sheet. The joint between the tube and tube sheet is, as shown, to be welded at the last mentioned side of said sheet by an arc struck from the tip of the electrode 7 forming part of a hand portable welding gun. This electrode, as shown, is carried by an axially rotatable body 9 in eccentric relation thereto so that when the body rotates axially the tip of the electrode and the arc struck from it will move in a circular orbit about the joint to be welded. As shown, this body is rotatably carried by an operatively stationary sleeve 11, the body itself carrying a mandrel 13 which is inserted in the bore of the tube so as to register the axis of rotation of said body with the axial line of the tube. As shown, the sleeve 11 at its forward edge 15 bears against the adjacent side of the tube sheet so as to space the electrode tip properly from the joint, the sleeve also serving as a heat and light shield between the arc and the space surrounding the gun at the adjacent side of the tube sheet. The gun further comprises a nozzle 17 from which is projected toward the tube sheet a stream of inert gas for shielding the arc and the work. When the tube sheet and tube are of brass the joint may be completely welded upon the electrode making one orbital revolution, which would take roughly about 5 seconds when the tube is of the size ordinarily employed in steam surface condensers and like heat exchangers, say tubes about ¾ inch outside diameter having wall thicknesses of about 0.05 inch.

As the gun above described forms the subject of applicant's above mentioned pending application, and per se does not form part of the present invention, it is deemed unnecessary further to describe it.

Figure 4:
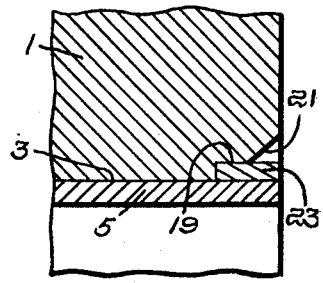
Fig. 4 is a fragmentary sectional view, on an enlarged scale, illustrating a step in forming the tube and tube sheet assembly to be welded.

In the modification of the invention shown by Figs. 1 to 5 that the end of the through opening 3 in the tube sheet, which is adjacent the side thereof at which the gun is positioned, is formed with an enlargement comprising an inner cylindrical portion 19 and a communicating portion 21 which flares outward as it extends from said cylindrical portion to that side of the tube sheet. After the tube 5 is inserted in the through opening 3 there is slipped into the just described enlargement a thin walled cylindrical sleeve 23 which, as indicated in Fig. 4, throughout its length interiorly fits the outer surface of the tube and at the inner portion of its length exteriorly fits the wall of the cylindrical portion 19 of the enlargement. After the parts are in their position shown by Fig. 4 a suitable tool is entered into the end of the tube bore from the adjacent side of the tube sheet and that tool operated to flare outward through their circumferences the portion 25 of the tube and contacting portion 27 of the sleeve 23 which are surrounded by the wall of the flared portion 21 of the enlargement, thus partially to fill the cavity formed by said flared portion, and to form the assembly indicated by Fig. 5.

Figure 5:
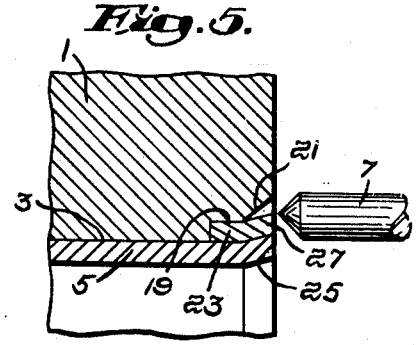
Fig. 5 is a fragmentary sectional view, on an enlarged scale, indicating the completed assembly to be welded.

As the arc struck by the electrode travels around the joint between the tube and tube sheet the sleeve 23 and adjacent portions of the tube sheet and tube will be progressively melted and the molten metals will mix. By having the expanded portion 27 of the sleeve 23 only partially fill the flared portion 21 of the enlargement of the opening in the tube sheet a space is left in which the molten metal may collect and, perhaps more importantly, to minimize the conduction of heat away from the sleeve and tube by the relatively massive tube sheet, the portions of which latter adjacent the sleeve heat up more slowly than the sleeve and the portions of the tube surrounded by it. Because of conduction of heat by the tube sheet away from the joint being welded it has been found that best results will be secured when the electrode tip is so positioned as to be about opposite the outer periphery of the outer edge of the sleeve 23, as indicated in Fig. 5. Ordinarily the entire sleeve 23 will melt and likewise the adjacent portions of the tube sheet surrounding it, as will also for at least a portion of its wall thickness the portion of the tube surrounded by the sleeve, although in some instances the extreme inner end portion of the sleeve within the cylindrical portion 19 of the enlargement may not entirely melt. However, the flared portions of the sleeve and tube in all instances are completely melted.

It is important to observe that in the construction indicated in Fig. 5 the arc as it travels in its orbit progressively melts the flared portions of the sleeve and tube, there being in advance of the arc an unmelted arcuate fragment of these flared portions of progressively decreasing length. These unmelted portions maintain the sleeve within the enlargement until the arc completes its orbital movement. In all ordinary cases the welding is performed with the tube sheet positioned vertically, and were not something provided to prevent it there would be no assurance that the unmelted fragment of the ring would not fall from the enlargement which receives it whether the entire ring is melted or only the flared portion of it and the flared portion of the tube.

Figure 6:
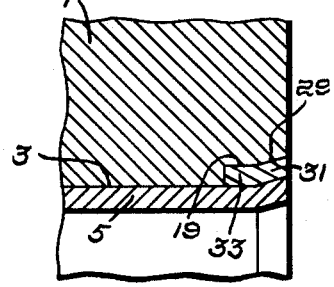
Fig. 6 is a fragmentary sectional view, on an enlarged scale, indicating a modified form of the tube sheet and tube assembly to be welded.

Although the assembly is preferably that indicated in Fig. 5, it is possible to so construct the enlargement of the opening 3 in the tube sheet that the space shown in that figure surrounding the flared portions of the ring and tube will be omitted and the sleeve contact the outer circumferential wall of the flared portion of the enlargement as indicated in Fig. 6, in which figure the flared portion 29 of the enlargement has the same taper as that of the flared portion 31 of the ring 33, the tapered portion of the ring having approximately the same taper as in the assembly indicated in Fig. 5.

It will be understood that in the drawings, for convenience of illustration, the parts are shown as much enlarged as compared to the actual size of the tube employed in the ordinary steam surface condenser and like heat exchangers. For example, with an Admiralty brass tube, having a ¾ inch outside diameter and a wall thickness of about 0.05 inch, to be welded to a Naval brass tube sheet the silicon bronze sleeve 23 need be no more than about 0.1 inch long with a wall thickness of about 0.03 inch, the flared portion of the sleeve and corresponding portion of the tube having an axial length of about one-half that of the sleeve. It has been found that satisfactory results will be secured when the flared portions of the sleeve and tube are at an angle of about 15 degrees to the axis of the tube and, where the construction is that indicated in Fig. 5, with the flared portion of the enlargement of the opening in the tube sheet at an angle of about 40 degrees to the axis of the tube. None of these dimensions are however critical, although it is desirable to have the silicon bronze ring no longer nor of a greater wall thickness than found necessary properly to promote welding and secure a non-porous weld.

It will be understood that within the scope of the appended claims wide deviations may be made from the forms of the invention herein described without departing from the spirit of the invention.

I claim:

1. A metal tube sheet and metal tube assembly comprising a tube sheet formed with a through opening of transverse circular cross-section, a tube of transverse exterior circular cross-section the body of which lies at one side of said sheet and has its end portion extending through said opening with its end positioned adjacent the opposite side of said sheet, said opening having at its end adjacent said oppossite side a circumferential enlargement surrounding the end portion of the tube, said opening enlargement comprising a plurality of adjoined portions of different diameter including an inner cylindrical portion and an outwardly flaring portion of larger diameter, the latter terminating in the plane of said opposite side of the sheet, a sleeve of weld promoting metal in said enlargement surrounding the tube, said sleeve of an extent axially of the tube substantially that of said plurality of the sheet opening enlargement portions, the inner end portion of said sleeve being cylindrical and being received in the cylindrical portion of said enlargement in substantially lateral contacting relation to the tube and that wall of said cylindrical portion of said enlargement which faces the tube, the portion of said sleeve within the outwardly flaring portion of said enlargement flaring outward, and the portion of the tube surrounded by said outwardly flaring portion of said sleeve being correspondingly outwardly flared to contact that portion of the sleeve, said flared sleeve portion and said flared tube portion constituting cooperating portions collectively acting to withhold withdrawal from said enlargement of unmelted portions of the sleeve during circumferential arc welding thereof.

2. The assembly according to claim 1 in which the tube sheet and tube are of brass and the sleeve is of silicon bronze containing sufficient silicon to prevent fuming of the zinc during the welding operation.

3. The assembly according to claim 1 in which that end portion of the enlargement which is adjacent the side of the tube sheet on which it opens flares outward away from the tube as it approaches said side.

References Cited in the file of this patent

UNITED STATES PATENTS

| | | |
|---|---|---|
| 1,299,396 | Coleman | Apr. 1, 1919 |
| 2,027,330 | Wilkins | Jan. 7, 1936 |
| 2,052,140 | Jennison | Aug. 25, 1936 |
| 2,053,808 | Young | Sept. 8, 1936 |
| 2,079,411 | Jennison | May 4, 1937 |